(No Model.)
C. STEFFEN.
LIXIVIATING BATTERY FOR RAW SUGAR.
No. 403,788. Patented May 21 1889.
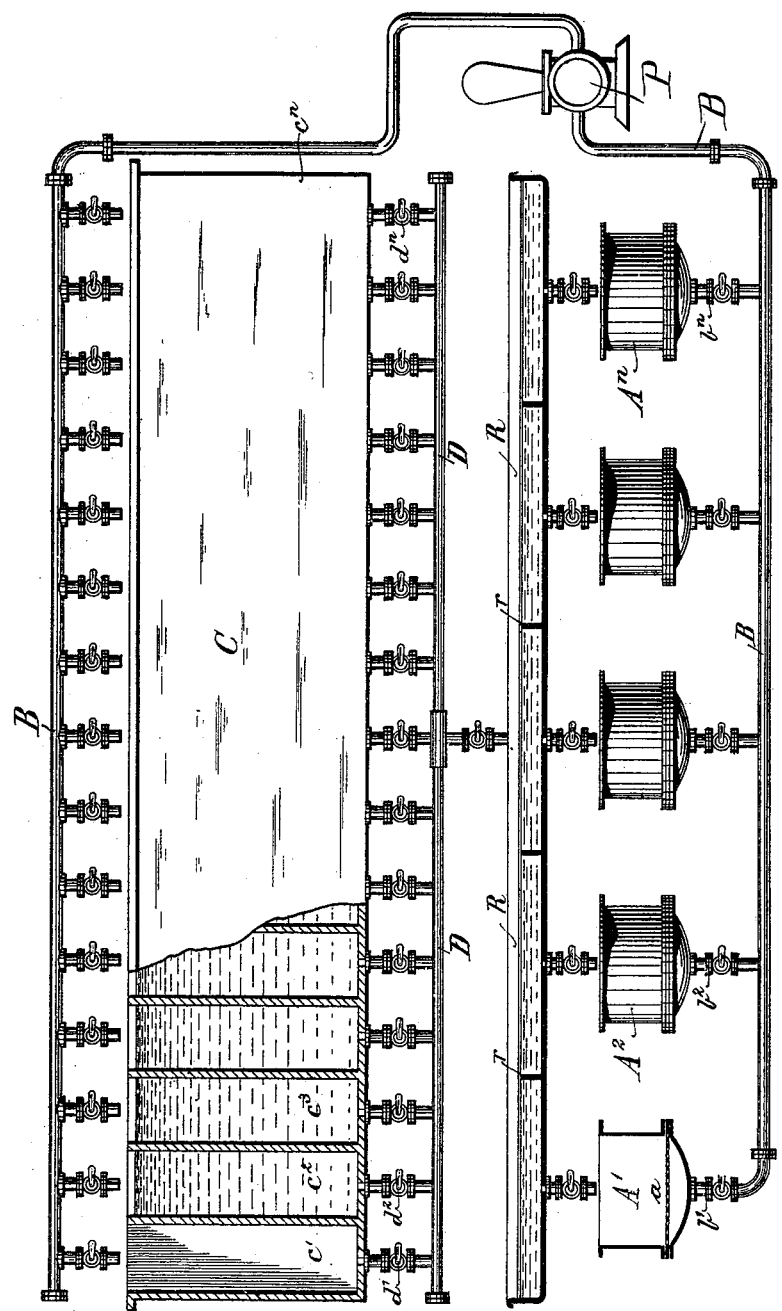

UNITED STATES PATENT OFFICE.

CARL STEFFEN, OF VIENNA, AUSTRIA-HUNGARY.

LIXIVIATING-BATTERY FOR RAW SUGAR.

SPECIFICATION forming part of Letters Patent No. 403,788, dated May 21, 1889.

Application filed December 29, 1888. Serial No. 294,924. (No model.)

*To all whom it may concern:*

Be it known that I, CARL STEFFEN, of Vienna, Austria-Hungary, have invented a certain new and useful Improvement in Lixiviating-Batteries for Raw Sugar or Sugar Mass, and of which I declare the following to be a specification.

My invention relates to improvements in lixiviating-batteries for raw sugar or raw-sugar mass, in which the lixiviation or washing of the sugar mass is effected by means of an aqueous alcoholic or other solution of sugar in a systematic manner—*id est*, by saccharine solutions of varying concentration.

According to the method above mentioned the removal of the disadvantage that the lixiviating-fluid, in consequence of its varying concentration, remains too long in contact with the sugar mass, and that the sugar which crystallizes out of the lixiviating-fluid delays the passage of the said fluid through the mass of sugar, is effected by employing a lixiviating-battery of special construction.

This lixiviating-battery consists of the connection of washing or suction vessels with special vessels, cells, or compartments, (cellular system,) in which the lixiviating-fluid is separately collected according to its varying specific gravity.

Now, the object of my present invention is a novel combination of the cells and lixiviating-vessels for the lixiviating-battery, the object of which is to simplify the construction of the washing or lixiviating vessels belonging to the battery and to render the mode of operation more uniform, which improvement, according to the accompanying drawing, which represents my improved apparatus partly in elevation and partly in section, consists in employing a single vessel divided into a number of cells or compartments, as a central cellular vessel in connection with a large number of washing or suction vessels.

A cellular vessel or vessel subdivided into a large number of cells or compartments must be able to contain at least two and a half times the quantity of washing or lixiviating fluid that the vessels which are for the greater part filled with the raw sugar or sugar mass to be operated on can contain, the contents of the said cellular vessel being distributed over more than twelve cells in the well-known succession. The contents of each single cell of the central cellular vessel is simultaneously employed for all the lixiviating-vessels of the battery in such manner that the entire contents of each cell is divided into as many portions as there are lixiviating-vessels in the battery. Consequently each washing-vessel receives its washing or lixiviating fluid from the central cellular vessel as if a separate cellular system were provided for each single lixiviating-vessel. The operation is carried out in charges in such manner that the entire contents of one cell is equably distributed to all the washing-vessels, and this is effected by means of a distributing apparatus, R, which receives the entire quantity of the washing-fluid in each cell of the central cellular vessel, and is subdivided into a number of compartments corresponding with the number of washing or lixivating apparatus employed. The washing-vessels are charged from these compartments with a corresponding quantity of lixiviating-fluid. In the accompanying drawing I have represented this distributing apparatus as a shallow vessel or trough, R, which is subdivided by partition walls $r$, for receiving the separate charges of washing-fluid for each lixiviating-vessel $A'$ $A^2$ to $A^n$, the sum total of the said fluid in these compartments representing the contents of one cell, $c'$, $c^2$, or $c^3$, &c., of the central cellular vessel, C.

The vessels $A'$, $A^2$ to $A^n$ are provided with sieve-bottoms $a$, and can all be connected to a common service-pipe, B, by short connections with cocks $b'$, $b^2$ to $b^n$, said service-pipe leading to the cells of the central cellular vessel, C, while the outlets from the said central vessel, with their cocks $d'$, $d^2$ to $d^n$, connect the separate cells with the supply-pipe D for the distributing-vessel R, measuring off the fluid for each separate lixiviating-vessel $A'$, $A^2$ to $A^n$.

The operations with the aforedescribed lixiviating-battery are carried out in the following manner: The washing or lixiviating vessels $A'$, $A^2$ to $A^n$, which are for the greater part filled with raw sugar or sugar mass, are then charged with the contents of the first cell, $c'$, of the central cellular vessel, C, which contains the most concentrated fluid, in such manner that the contents of the said cell $c'$ are distributed in equally large portions and led onto the raw sugar or sugar mass contained in each separate washing or lixiviating vessel, $A'$, $A^2$ to $A^n$. In like manner the contents of the entire number of cells in the central cellular vessel, C, are successively led into the washing or lixiviating vessels $A'$, $A^2$ to $A^n$. After the washing-fluid has passed the lixiviating-vessels, and a quantity corresponding to the quantity of molasses extracted from the raw sugar has been abstracted, the same is again led back into the central cellular vessel in the same succession as it was delivered, in order to be employed for a new washing or lixiviating operation. From this it will be seen that the same cells will always contain the same kind of lixiviating-fluid, and that the last residue of washing-fluid adhering to the sugar-crystals will be driven off by the succeeding pure solution of sugar and be led back into the last cell, $c^n$, of the central cellular vessel, C, the pure sugar solution being again supplied to each washing-vessel in exactly corresponding portions.

As stated, any suitable means may be used to raise the lixiviating material from the lixiviating-vessel to the cellular vessel; but I have shown as one convenient means a pump, as at P.

Having now particularly described the nature of my said invention and in what manner the same is to be performed, I declare that what I claim is—

1. A lixiviating-battery for raw sugar or sugar mass, consisting of a central cellular vessel for containing the graded lixiviating material, a series of lixiviating-vessels for containing the sugar to be treated, and an interposed distributer having independent connection with each cell of the charging-vessel and in connection with each lixiviating-vessel of the series, whereby the contents of each cell are distributed and applied equally to the sugar in each lixiviating-vessel, substantially as described.

2. A lixiviating-battery consisting of the cellular vessel C, a series of lixiviating-vessels for the sugar to be treated, an interposed distributer, connections from each cell to the distributer, connections from the distributer to each lixiviating-vessel, and a return-pipe connecting with each lixiviating-vessel leading to the vessel C, with connections from said pipe to each cell, substantially as described.

3. In combination with the cellular vessel C and the lixiviating-vessels, an interposed distributer divided into compartments equal in number to the number of lixiviating-vessels, and with a capacity equal to the contents of one cell, substantially as described.

4. In combination, a cellular vessel, C, a series of lixiviating-vessels, a distributer, R, valved pipe-connections from the bottom of each cell to a pipe, D, a valved connection between said pipe and the distributer, and a valved connection from each compartment of the distributer to a lixiviating-vessel, substantially as described.

In witness whereof I have hereunto signed my name in the presence of two subscribing witnesses.

CARL STEFFEN.

Witnesses:
   F. KÖHLER,
   CARL SALOMAN.